United States Patent
Baier

(10) Patent No.: US 8,644,275 B2
(45) Date of Patent: Feb. 4, 2014

(54) METHOD FOR WLAN LOCALIZATION AND LOCATION BASED SERVICE SUPPLY

(75) Inventor: Gerhard Baier, Nuremberg (DE)

(73) Assignee: Telefonbuch Verlag Hans Müller GmbH & Co. KG, Nuremberg (DE)

( * ) Notice: Subject to any disclaimer, the term of this patent is extended or adjusted under 35 U.S.C. 154(b) by 725 days.

(21) Appl. No.: 12/742,354

(22) PCT Filed: Oct. 30, 2008

(86) PCT No.: PCT/EP2008/064742
§ 371 (c)(1),
(2), (4) Date: Jun. 30, 2010

(87) PCT Pub. No.: WO2009/071394
PCT Pub. Date: Jun. 11, 2009

(65) Prior Publication Data
US 2010/0272085 A1    Oct. 28, 2010

Related U.S. Application Data

(60) Provisional application No. 60/992,878, filed on Dec. 6, 2007.

(51) Int. Cl.
*H04W 4/00* (2009.01)
*H04W 24/00* (2009.01)
(52) U.S. Cl.
USPC ........................................ 370/338; 455/456.6
(58) Field of Classification Search
None
See application file for complete search history.

(56) References Cited

U.S. PATENT DOCUMENTS

| | | | |
|---|---|---|---|
| 2004/0152471 A1* | 8/2004 | MacDonald et al. | 455/456.1 |
| 2005/0075118 A1 | 4/2005 | Lewis et al. | |
| 2005/0136845 A1 | 6/2005 | Masuoka et al. | |
| 2005/0261004 A1 | 11/2005 | Dietrich et al. | |

(Continued)

FOREIGN PATENT DOCUMENTS

| | | |
|---|---|---|
| CN | 1434304 | 8/2003 |
| CN | 1798428 | 7/2006 |

(Continued)

OTHER PUBLICATIONS

Liu et al., "Some Key Issues and Application of Location_based Services", Feb. 2005, Jiangxi Science, 1994-2011 China Academic Journal Electronic Publishing House, 6 pps.

*Primary Examiner* — Jutai Kao
(74) *Attorney, Agent, or Firm* — Fay Kaplun & Marcin, LLP

(57) ABSTRACT

A method is for WLAN localization and corresponding location based service supply. By providing a WLAN data set as an actual WLAN fingerprint of a geographical unit for the usage in a mobile device the user is enabled to localize himself self-sustained. Thereby the mobile device receives WLAN signals from at least three WLAN senders for the localization. Due to self-sustained identifying of the WLAN senders by the mobile device on basis of the received WLAN signals the mobile device may calculate the actual geographical position of the mobile device. The calculation is done on basis of the WLAN data set and on basis of the received WLAN signals from the at least three different WLAN senders. Furthermore a location based service is supplied by the mobile device the a user of the mobile device on basis of the calculated actual position.

21 Claims, 11 Drawing Sheets

(56) References Cited

U.S. PATENT DOCUMENTS

| | | | |
|---|---|---|---|
| 2006/0232472 A1 | 10/2006 | Roslak | |
| 2008/0076431 A1* | 3/2008 | Fletcher et al. | 455/440 |
| 2008/0132298 A1* | 6/2008 | Roh et al. | 455/574 |
| 2008/0248813 A1* | 10/2008 | Chatterjee | 455/456.2 |
| 2009/0098903 A1* | 4/2009 | Donaldson et al. | 455/552.1 |
| 2012/0202521 A1* | 8/2012 | Shkedi | 455/456.1 |
| 2012/0230313 A1* | 9/2012 | Alizadeh-Shabdiz | 370/338 |
| 2012/0276884 A1* | 11/2012 | Othmer | 455/414.3 |

FOREIGN PATENT DOCUMENTS

| | | |
|---|---|---|
| CN | 101 019 444 | 8/2007 |
| EP | 1 237 009 | 9/2002 |
| JP | 08-297159 | 11/1996 |
| JP | 2002-304408 | 10/2002 |
| JP | 2002-324075 | 11/2002 |
| JP | 2007-221701 | 8/2007 |
| WO | 2005/0106523 | 11/2005 |
| WO | 2006/110181 | 10/2006 |
| WO | 2007/056738 | 5/2007 |

* cited by examiner

METHOD FOR WLAN LOCALIZATION AND LOCATION BASED SERVICE SUPPLY

This application claims the benefit of the filing date of the U.S. Provisional Patent Application No. 60/992,878 filed 6 Dec. 2007, the disclosures of which is hereby incorporated by reference.

FIELD OF THE INVENTION

The invention relates to localization systems and location-based service supplies. In particular the invention relates to a method for WLAN localization and location-based service supply, a mobile device for WLAN localization and location-based service supply, a mobile gauging device for generating a WLAN data set of a geographical unit, a computer program element and a computer-readable medium.

BACKGROUND OF THE INVENTION

Position determination is the main component of navigation systems and any location-based service. The localization of objects and persons in three dimensional spaces has become an important functionality in modern technology. After having supplied the first generation of positioning systems on satellite based systems like the global positioning system (GPS) it becomes more and more important to develop localization systems, that offer a higher resolution in urban infrastructures like street canyons. As the GPS for example requires a constant intervisibility between the user and different satellites, positioning might be difficult in areas with buildings. Furthermore the GPS-based systems may be of high costs and additional user devices are needed for localization. In times of strong enhancement of WLAN availability due to an increase of WLAN access points and implementation of WLAN functions in various electronic devices, WLAN radio waves are nearly everywhere, especially in urban areas. Additionally the demand for location-based services, that deliver services to the user with respect to his actual an updated position have been arisen recently. As known localization procedures often only base on calculating the strength of field of a propagating WLAN signal, an unavoidable source of mistakes may be buildings and other obstacles that haven't been considered during the calculation process.

SUMMARY OF THE INVENTION

It may be an object of the invention to provide for an improved location-based service and WLAN localization.

The described embodiments similarly pertain to the method for WLAN localization and location-based service supply, the mobile device for WLAN localization and location-based service supply, the mobile gauging device for the generation of a WLAN data set of the geographical unit, the computer program element and the computer-readable medium. Synergetic effects may arise from different combinations of the embodiments although they might not be described in detail.

Further on, it shall be noted that all embodiments of the present invention concerning a method, might be carried out with the order of the steps as described, nevertheless this has not to be the only and essential order of the steps of the method. All different orders and combinations of the method steps are herewith described.

According to a first aspect of the present invention, a method for WLAN localization and location-based service supply is presented, wherein the method comprises the following steps: providing a WLAN data set of a geographical unit for the usage in a mobile device, receiving WLAN signals by the mobile device from at least three WLAN senders, self-sustained identifying of the WLAN senders by the mobile device on basis of the received WLAN signals. Further on, the method comprises the step of calculating an actual position of the mobile device by the mobile device on basis of the WLAN data set and on basis of the received WLAN signals from the at least three different WLAN senders, and supplying a location-based service by the mobile device to a user of the mobile device on basis of the calculated actual position. This autarkic and self-sustained WLAN localization and local based service supply on the mobile device of the user does not need any web access or any technical devices. Furthermore, a user of the inventive method cannot be localized from an exterior system, as the position information stays securely on the mobile device.

Thereby providing a WLAN data set may include the storage of a WLAN data set file of the respective geographical unit on the mobile device. But also getting access to an exterior WLAN data storage system like a server is comprised in the meaning of providing a WLAN data set. The geographical unit might be any terrestrial surrounding like a village, city or a suburb of a city in which WLAN senders are positioned. The WLAN data set may also be seen as a WLAN fingerprint of the geographical unit at a certain point of time with respect to all receivable WLAN field intensities at all or some exact geographical positions within this unit. The WLAN data set therefore delivers the electromagnetic field intensity distribution for each receivable WLAN sender within the unit. In other words the WLAN data set is used as a WLAN relief or profile which is used to determine the actual position of the mobile device. The received WLAN signals are matched with the WLAN relief and the position may be determined.

Further on the term mobile device may comprise any type of smart phones, mobile phones, any type of personal digital assistant (PDA), a notebook, a normal PC, an electronic dictionary or any other handheld mobile device, that offers a possibility to receive WLAN signals from the surrounding.

Further on, the term WLAN signal may comprise an electrical and magnetic field intensity as well as information that may be sent via the WLAN signal for example the identity, distinctive network address or IP number of the sender. Any information sent via the WLAN field might be used for a check against the WLAN data set or the WLAN relief to determine the position. The term WLAN sender is used for these functionalities.

By the self-sustained identifying of the WLAN senders by the mobile device there is neither web access nor any connection to a GPS supported system or any other type of databank needed for localization and supplying the demanded service. Thereby the method for WLAN localization may regard all available WLAN networks or WLAN senders, commercial WLAN hotspots as well as private WLAN senders are used to process the localization and to supply location-based service.

Furthermore, the calculation is done on basis of the received WLAN field intensities and sender identity information that is sent within the WLAN signals by comparing the received WLAN signals with the data of the WLAN data set with respect to the position, at which the user is situated at the moment of the user demand (position of demand). Thereby an amount of three or more WLAN senders might be necessary for the calculation. But in some WLAN infrastructures also only one WLAN sender or two WLAN senders may be enough for the mobile device and the method, to determine the actual position.

Generally, in this process of the calculation the WLAN data set is used as a WLAN fingerprint of the geographical unit in which the user is moving at the moment. In the WLAN data set the field intensity of each receivable WLAN sender at each position within the unit is stored. At the time of a service or localization demand, the actually received WLAN signals are compared with the data of the WLAN data set. In other words, after having received WLAN signals with an identification of the senders, it is used, that the WLAN data set is delivering the information of the filed intensity distribution of each received WLAN sender to the mobile device. Comparing these data with the received WLAN field intensities allows the calculation of the actual position of the user by the mobile device itself without any web access or external help.

During the calculation, reference data from the WLAN data set may be supplied to the calculating algorithm as well as a model of the geographical unit and certain configuration parameters.

After having calculated the actual position of the user and after a possible demand of a service, the location-based service is supplied by the mobile device to the user. Thereby the mobile device recognizes and uses the calculated actual position during his delivering of the demanded service. The selection process of the offered service is based on the actual, by the mobile device beforehand determined position as well as the availability of the demanded service, like for example opening hours of restaurants. The information of the services offered by the mobile device that have been searched out of a service data set by the mobile device may be stored on the mobile device or on an external storage medium.

The service data set may be comprised in the WLAN data set, but also a separate data set is possible. In addition a document server may be part of the WLAN localization for storing the WLAN data set as well as the service data set.

Thereby the term supplying a location-based service may include displaying a local service to the user on any display, printing a hard copy of an offer of a local service, sending an information SMS concerning an offer of a local-based service and a voice announcing a local-based service to the user via a headphone or a loudspeaker.

During the calculation of the actual position triangulation methods may be implemented in the algorithms and in the method steps performing the WLAN localization and the local based service supply.

In other words, the localization of a mobile device and its user and the supply of a location-based service is realised in combination with a WLAN infrastructure that hasn't especially been built for the use of this WLAN localization. This may reduce costs and effort to initiate the WLAN localization and may increase the user friendliness and the fastness of reaction of the method or of the mobile device as well as the comfort and speed of supplying the service. The inventive method may further deliver services, when GPS or GPRS may be out of work for example because of no intervisibility between the user and satellites. Further the localization may be combined with ordinary WLAN communication.

According to another exemplary embodiment of the present invention, the method further comprises the step of updating the WLAN data set by the mobile device on basis of the received WLAN signals.

This function of renewing the WLAN data set may guarantee that the provided WLAN data set offers exact an actual data during 24 hours a day, 365 days a year.

In a first scenario, the mobile device receives more senders, than the necessary amount for the localization. The so called excess senders may be checked by the mobile device with respect to a possible update of the WLAN data set in case of a deviation. This process may be done after the position determination or WLAN localization has been done on basis of the received WLAN senders that are not excess senders. In a second scenario the position of the mobile device is available without using the localization method. In such a case the device may also be able to check the data of the WLAN data set by comparing the received WLAN signals with the entries of the data set of that position. In case of a deviation, for example because field intensities have been changed due to new buildings or the absence of a sender, the mobile device may be enabled to renew the old entries of the WLAN data set by posting the actual information about the new field intensities or new senders.

Further on, as another exemplary embodiment of the invention, an update service may be implemented, that patrols and controls the geographical unit by passing by with a mobile device or a gauging device that is able to receive WLAN signals and may update the WLAN data set in case of a measured deviation.

Such a device determines its own GPS position and compares the received WLAN signals with the spatially corresponding entries in the WLAN data set. In case of any deviation, the update service sends update signals to the site, where the WLAN data set is stored, and renews the entries by the actual data. Additionally the actual data may include time stamps. In other words an automated gathering of a WLAN data set as reference measurements may be performed. In order to increase the efficiency of the method, the generation and updating of the WLAN data set might be done with help of public services, city services or the commune. This might for example be done by mailman, postal services, logistic services, a garbage collection system or cleaning automobiles within the geographical unit. This process may be done indoor and outdoor, which may lead to continuous building plans concerning WLAN signals and indoor WLAN fingerprint data. In total this may lead to a indoor and outdoor self learning method and system of WLAN localization and service supply.

According to another exemplary embodiment of the present invention the step of updating comprises the following steps: comparing the WLAN data set with the received WLAN signals by the mobile device with respect to the actual position, sending a renewing signal with new WLAN data by the mobile device to a storing site of the WLAN data set in case of a deviation after the comparing, sending a confirmation signal with a time stamp by the mobile device to the storing site in case of no deviation after the comparing. This exemplary embodiment further comprises the steps of replacing data of the WLAN data set by the new WLAN data in case of a deviation after the comparing and assigning the WLAN data set with a time stamp in case of no deviation after the comparing.

Providing an updated WLAN data set with time stamps may lead to greater reliability of the used localisation system and may therefore enhance the user satisfaction and the felt confidence of the user during the usage of the inventive method.

Another exemplary embodiment of the present invention further comprises the following step of calculating a range of the received WLAN signals on basis of the WLAN signals and on basis of the surrounding of the actual position.

Using propagation characteristics of radio waves like transmission, reflection and absorption coefficients for different materials of the surrounding of a WLAN sender may lead to a refined localization process with a higher spatial resolution.

According to another exemplary embodiment of the present invention, the identifying and the calculating of the actual position of the mobile device does not need any web access.

By using an existing infrastructure of WLAN senders in the geographical unit no costs and efforts may occur for initializing the inventive method. As the WLAN data set may be stored on the mobile device and as this data set may specify available services within the geographical unit no wireless wired connection is needed for processing the inventive autarkic method for WLAN localization and location-based service supply.

According to another exemplary embodiment of the present invention, the calculation of the actual position tolerates a defined deviation of the received WLAN signals compared to the WLAN data set.

In order to offer a continuous and exact localization and service supply time-dependent deviations of the field intensities at a certain geographical position may be considered within this step. Therefore, different weather conditions or different traffic conditions in the infrastructure of the geographical unit may lead to a slightly deviated WLAN propagation of the different receivable senders. This may be mathematically integrated within the calculation algorithm for positioning.

According to another exemplary embodiment of the present invention, the location-based service is supplied from a service data set wherein the service data set is downloadable from a server to the mobile device.

In order to be able to provide a broad spectra of services to the user of the mobile device, different types of databases or databanks may provide service data set to the mobile device. This leads to an autarkic service supply by the mobile device after having downloaded the necessary information. The service data set may also be stored on other storage media.

According to another exemplary embodiment of the present invention, the location-based service is from a business chosen from the following group comprising restaurants, hotels, taxi services, medical services, pharmacy, cultural entertainment, fleet management, guided tours for persons, localization of public transport vehicles, mobile marketing or friend finding.

Navigating a person to several different locations, services or events may be realised by the mobile device. Guiding a person to his car may be an example. Also communication tools may be provided in order to do reservations, bookings, confirmations, cancellations or notifications to different types of communication partners like doctors, cinemas, theatres, taxi services, persons of the personal environment of the user and external servers or working stations. This secretary function of the mobile device may ease the tasks of a person trying to navigate through an unknown city especially when searching for a specific services. Furthermore marketing activities may be displayed to the user on the mobile device depending on the actual position of the user. Another application of a local based service may be friend finding i.e. a navigation of the users friends, that have been localized in the close environment of the user. The mobile devices of a predefined group of persons (e.g. friends) may stay in contact and update each other about their WLAN localized position. If the distance of two persons falls below a defined threshold value, a signal is announced to the users by the respective mobile devices.

According to another exemplary embodiment of the present invention, the method further comprises the steps of providing map data for the mobile device, displaying at least a part of the geographical unit to the user by using the map data and displaying the actual position to the user on a display.

In order to navigate and guide the user in an intuitive way, different types of map data like two- or three dimensional map data, animated map data and coloured map data may be used for displaying the actual position, services and the way to services.

According to another exemplary embodiment of the present invention, the method further comprises the steps of receiving an user demand for a location-based service, searching for at least one supply in the service data by the mobile device on basis of the calculated actual position and displaying the at least one supply on a display to the user.

As the actual position of the user has been calculated before, the selection of a service offered to the user considers the spatial coordinates of the actual inhabitancy. This may lead to a fast and efficient service selection for the user.

According to another exemplary embodiment of the present invention, the method comprises the step of calculating a speed and a direction of movement of the mobile device on basis of multiple calculated positions during a period of time.

According to another exemplary embodiment of the present invention, the method further comprises the step of supplying a location-based service by the mobile device on basis of the calculated speed and direction of movement of the mobile device.

In other words the determined orientation of movement of the user with the mobile device may lead to a selection of services, that a provided in an spatial area into which the user may more or less heading to. Further on an arrival time may be calculated for each service possibility, which may lead to a further service selection on basis of additional information like opening hours or beginning times of events. In other words, only those services out of the service data set may be announced to the user, that he may reach with the calculated speed in time.

According to another exemplary embodiment of the present invention, the calculation of the actual position is done by a first algorithm on the mobile device.

This first algorithm may be part of a computer program element, that may be stored on the mobile device and may enable the device to perform the steps of the inventive method. Thereby an algorithm, that calculates the actual position on basis of a comparison of the received WLAN field intensities with the stored WLAN fingerprints of each receivable sender in the WLAN data set may be provided.

According to another exemplary embodiment of the present invention the calculation of the actual position is a three-dimensional localization of the mobile device.

Additional altitude information may be provided by the localization process. This may lead to an improved navigation for the user especially in buildings with several height levels.

According to another exemplary embodiment of the present invention, the method comprises a further step of generating the WLAN data set by gauging the geographical unit with respect to WLAN signals.

In other words by gauging the geographical unit a database is generated in an generation mode. This data base might be used during an operating mode of the mobile device or any sensor being able to receive WLAN signals. A positioning algorithm uses the WLAN data set, which data set has been preprocessed for the mobile device. During the generation the field intensities of each sender are measured. By knowing the received power the area in which the signal of each sender is distributed can be determined. Another possible step may be a preparation of the data after the calculation of the position. Furthermore a system to do administrative services with the acquired data may be comprised within this method.

According to another exemplary embodiment of the present invention, the generation of the WLAN data set comprises the following steps: identifying each receivable WLAN sender at a chosen geographical position within the geographical unit on basis of WLAN signals sent by each sender, gauging WLAN field intensities of each receivable WLAN sender at the chosen geographical position. Further on, this exemplary embodiment comprises the step of gauging GPS coordinates of the chosen geographical position, assigning the gauged GPS coordinates to the gauged WLAN field intensities resulting in a data pair of each receivable WLAN sender and for the chosen geographical position and storing the data pair for each receivable WLAN sender and for the geographical position in the WLAN data set.

Thereby the generation may take place before the steps of performing a WLAN localization and supplying a local based service.

According to another exemplary embodiment of the present invention, the method comprises the step of assigning the data pair of each receivable WLAN sender with time stamps resulting in time data pairs.

According to another exemplary embodiment of the present invention, the method further comprises the step of defining further geographical positions within the geographical unit and scanning the geographical unit by repeating the beforehand defined steps at the defined further geographical positions.

In order to create a WLAN data set of a geographical unit a gauging device may do these different measurements and may assign the GPS coordinates of the chosen position with the WLAN information, like electromagnetic field intensities and transmitted sender identification for each receivable sender. Therefore a GPS unit is used and as well as a WLAN receiver. Repeating this procedure at different positions of the unit, fingerprints concerning the spatial field intensity distribution of each sender may stored in the WLAN data set. This might be the basis information for a subsequent localization and service supply as described above and hereinafter. These measurements may be done during day and night times to verify and adapt the stored values.

A further step might be to preprocess the WLAN data set data including formatting or editing. During this procedure they may be additionally updated or equalized with new measured WLAN data of the respective geographical unit.

According to another exemplary embodiment of the present invention, the generation of the WLAN data set is done by a second algorithm on the gauging device.

In other words the second algorithm may cause a gauging device to perform the steps of the above described methods concerning the generation of a WLAN data set or WLAN fingerprint of a geographical unit. Thereby this algorithm may cause a GPS unit and a WLAN receiver of the gauging device to perform the respective steps.

According to another exemplary embodiment of the present invention, a mobile device for WLAN localization and location-based service supply is presented wherein the mobile device comprises a memory, a WLAN receiver, a processor and a display. Furthermore, the memory is adapted to store a WLAN data set of a geographical unit, the WLAN receiver is adapted to receive WLAN signals, the processor is adapted to calculate an actual position of the mobile device on basis of the WLAN data set and on basis of the received WLAN signals, the processor is further adapted to carry out a comparison between the WLAN data set and the received WLAN signals and the display is adapted to provide a location-based service to a user of the mobile device on basis of the calculated actual position.

In other words the mobile device may offer a user the possibility to spatially localize himself autarkic i.e. without any web access. Further on the local based service may be supplied without having the need to contact different service institutions or databases, as a service data set may be stored on the mobile device. By concerning the calculated actual position of the mobile device service may be offered to the user that match to his position, to his arrival time at different possible service locations and to a fast and efficient guiding of the user by the device. The mobile device may for example be used to perform mobile marketing on basis of the actual position.

According to another exemplary embodiment of the present invention, the mobile device further comprises a sending unit wherein the sending unit is adapted to send an updating signal to a storing side of the WLAN data set on basis of the comparison.

According to another exemplary embodiment of the present invention, a mobile gauging device for the generation of a WLAN data set of a geographical unit is presented wherein the mobile gauging device comprises a WLAN receiver, a GPS unit, a processor and a memory. Therein the WLAN receiver is adapted to identify WLAN senders from receivable WLAN signals at a chosen geographical position and the WLAN receiver is further adapted to gauge WLAN field intensities of each receivable WLAN signal at a chosen geographical position. Further on, the GPS unit is adapted to gauge the GPS coordinates of the chosen geographical position wherein the processor is adapted to assign the gauged GPS coordinates to the gauged WLAN field intensities resulting in a data pair for each receivable WLAN sender wherein the memory is adapted to store the data pair and the WLAN data set for each receivable WLAN sender.

According to a further exemplary embodiment of the present invention, a computer program element is presented which computer program element is characterized by being adapted when a user on a general mobile device to cause the mobile device to perform the steps of the method according to one of the preceding embodiments.

This computer program element might therefore be stored on a computing unit, which might also be part of an embodiment of the present invention. This computing unit may be adapted to perform or induce the performing of the steps of the method described above. Moreover, it may be adapted to operate the components of the above described-mobile device. The computing unit can be adapted to operate automatically and/or to execute the orders of a user. Furthermore, the computing unit can request the selection from a user to process the input from the user.

This embodiment of the invention covers both a computer program, that right from the beginning uses the invention, and a computer program, that by means of an update turns an existing program into a program that uses the invention.

Further on, the computer program element might be able to provide all necessary steps to fulfil the procedure of WLAN localization and local based service supply as described in the methods and mobile device above.

According to a further embodiment of the present invention, a computer-readable medium is presented wherein the computer-readable medium has a computer program element stored on it which computer program element is described by the preceding section.

According to a further embodiment of the present invention, a medium for making a computer program element available for downloading, which computer program element is arranged to perform the method according to one previously described embodiment of the invention.

Furthermore the method and service may be provide by an industrial consortium that may comprise operators, map producing industries, network suppliers, data acquisition services, content provider, system integration provider, mobile device producer and localization technology provider. Thereby special WLAN data formats and WLAN interfaces for the WLAN localization method and local based service supplies may be part of the whole system. Also map data may be adapted to the use for the inventive method. Another application might be to link mobile services with city information.

It may be seen as the gist of the invention that a local service is supplied to a user on basis of a self-sustained and autarkic WLAN localized position, wherein the localization may allow to use WLAN fingerprints stored on a mobile device.

It has to be noted that the embodiments of the invention are described with reference to different subject-matters. In particular, some embodiments are described with reference to the method type claims whereas other embodiments are described with reference to apparatus type claims. However, a person skilled in the art will gather from the above and the following description that unless other notified in addition to any combination of features belonging to one type of subject-matter also any combination between features relating to different subject-matters is considered to be disclosed with this application.

The aspects defined above and further aspects, features and advantages of the present invention can also be derived from the examples of embodiments to be described hereinafter and are explained with reference to examples of embodiments. The invention will be described in more detail hereinafter with reference to examples of embodiments but to which the invention is not limited.

DETAILED DESCRIPTION OF THE DRAWINGS

Figure 1:
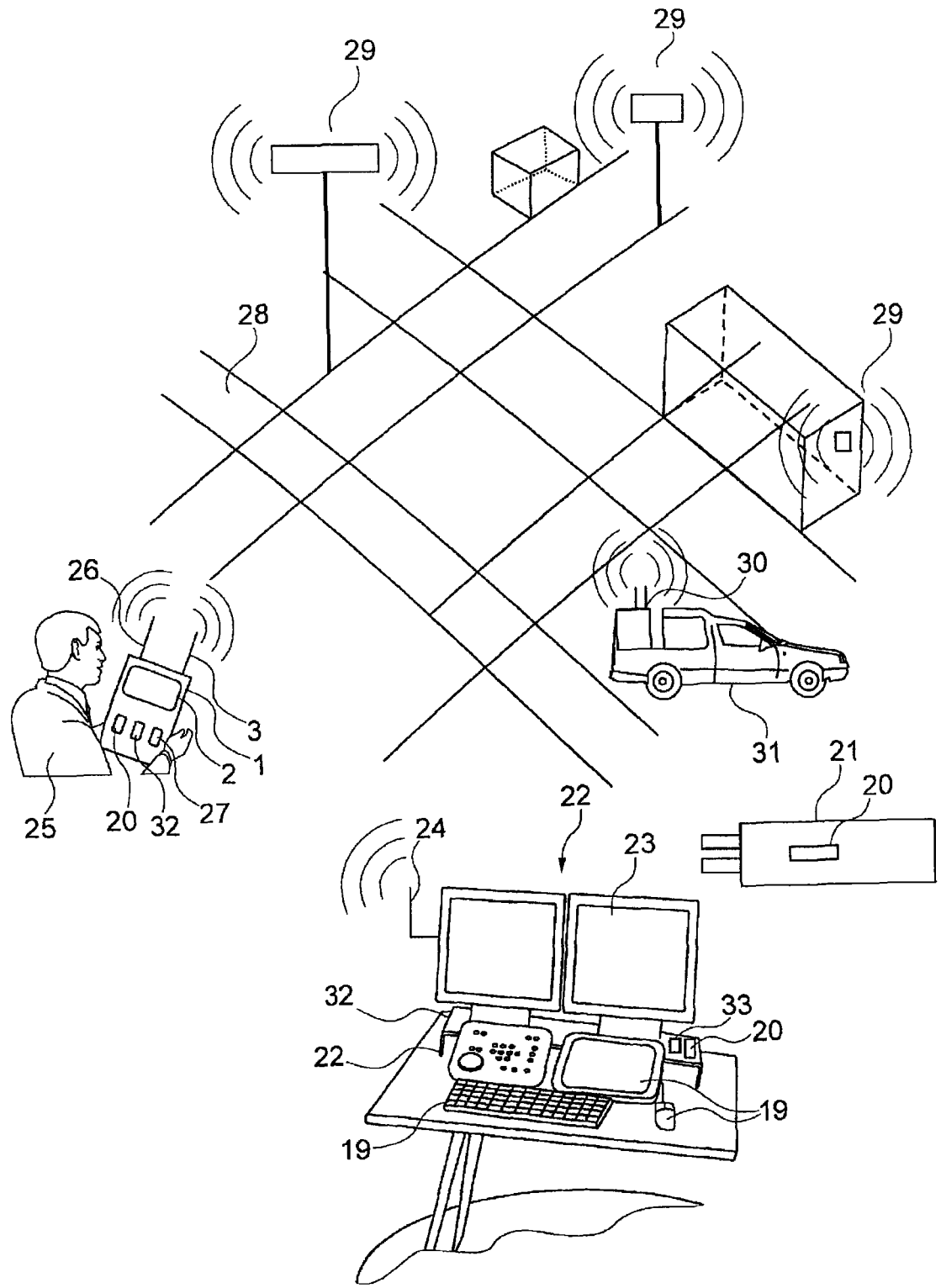
FIG. 1 schematically shows a user of a WLAN localization and location-based service supply according to an exemplary embodiment of the present invention.

Similar or relating components in the several figures are provided with the same reference numerals. The view in the figure is schematic and not fully scaled.

FIG. 1 shows the application of a mobile device 1 for WLAN localization and location-based service supply within a geographical unit 28. The user 25 may be enabled by means of the mobile device and its display 2 to find out his exact geographical position and actual service offers by applying an exemplary embodiment of the method for WLAN localization and location-based service supply on this mobile device. Thereby a WLAN receiver 3 at the mobile device is enabled to identify the WLAN senders 29. These senders may be situated outside or inside of buildings. Here, three WLAN senders are shown. Thereby an amount of three or more WLAN senders might be necessary for a calculation. But in some WLAN infrastructures also only one WLAN sender or two WLAN senders may be enough for the mobile device and the method, to determine the actual position.

As the mobile device may comprise a memory 27 on which a WLAN data set can be stored, the localization and service supply process does not need any web access or GPS access. The mobile device is enabled to identify the WLAN senders 29 due to their distinctive signal including an identification part like an IP address. By comparing the respective field intensity of the different received WLAN senders 29 with the beforehand stored field intensity distribution of each WLAN sender within the geographical unit 28 the mobile device may calculate the actual position of the user. Upon this calculated position a service demand by the user may be answered with service supplies that are selected out of service data set 33 that may also be stored on the mobile device 1. It may also be possible, that the WLAN data set 32 and the service data set 33 are stored on an external working station or server 22.

The server 22 may further comprise different user interfaces 19. Also the computer program element 20 that may cause a mobile device to perform the steps of the method localization and location-based service supply according to any embodiment of the present invention may be stored on a server. In order to enable the mobile device to process all method steps according to any exemplary method embodiment of the present invention, the computer program element 20 may be stored on the mobile device for example in the memory 27.

For exchanging data concerning the WLAN data set 32 and the service data set 33 between the mobile device 1 and the server 22 a wireless or also wired communication connection like a WLAN connection may be installed. Therefore, the server 22 may comprise a sender or a receiver 24 as well as the mobile device 1 may comprise a sending unit 26.

FIG. 1 further shows an updating device 31 that may permanently or non-permanently scan the geographical unit 28 with a gauging device 30. This gauging device may comprise a receiving and sending unit for WLAN signals as well as a GPS system. By crossing different geographical positions the WLAN data set that may generated or updated and stored on the server 22. This permanent or non-permanent update on basis of the measured field intensities of each receivable WLAN sender at each certain geographical position in the geographical unit 28 may lead to a self learning system. If any changes of field intensities or of new or absent WLAN senders are detected, the WLAN data set may be renewed by the new and actual data in combination with the parallel measured GPS position of the geographical position of the measurement. This may lead to a dynamical area-wide data acquisition.

Furthermore, a computer-readable medium 28 is shown on which a computer program element 20 might be stored as well.

The location-based service supply for a user may comprise information about different services and industrial branches.

For example a user, who was not able to identify his exact geographical position in a pedestrian area of a city may be provided with the service of calling a taxi wherein the user does not need to know a taxi phone number or the next place which is reachable for the taxi. Therefore, the mobile device may induce a taxi call by sending an SMS or via web service. Subsequently the user is guided on basis of an integrated city map, shown on the display 2, to the position of the taxi date. Furthermore, different culinary information may be supplied to the user like different restaurants styles like Italian, Spanish, Greek, German or other favours of the user. This may be supplied by displaying the different positions of different restaurants within the area of the beforehand calculated actual position of the mobile device 1. Thereby the service data set 32 in which the information about the restaurants of the geographical unit 28 is stored may comprise information about opening hours, the GPS coordinates of the restaurants or prices. Of course the mobile device is enabled to organize a reservation. Further on, hotels of different price categories may be shown on the display to the user. Further on, the location-based service may include tour guidance for persons, localization of public transport vehicles, pharmaceutical service especially for emergency cases. The nearest service like the next open pharmacy or the next medical service like a doctor may be displayed to the user. Further on, the mobile device may be equipped with information about different medical focuses of the different doctors.

The location-based service supply and therefore the service data set 32 may further be equipped with information about cultural events like theatres or cinemas. In order to guarantee being up to date for the service supply and the service data set, an automatically updating program may be installed to keep the mobile device and a possible server actual. Further on, a telephone call for ticket reservation may be done by the mobile device on basis of the calculated actual position. Another example for a service supplied may be information about public transport like time tables or the GPS position of stops of different lines. In order to be able to find a certain item or building or in general a certain geographical position again, the user may mark this wanted position on the display of the mobile device for example the position where he has parked his car, wherein the mobile device is enabled to guide the user back to that beforehand marked position at an arbitrary point of time. All supplied guidance services for the user may be done by visualized map data, by which the user is routed with different graphical or sound elements like arrows or a voice navigating the user to his selected aim.

Figure 2:
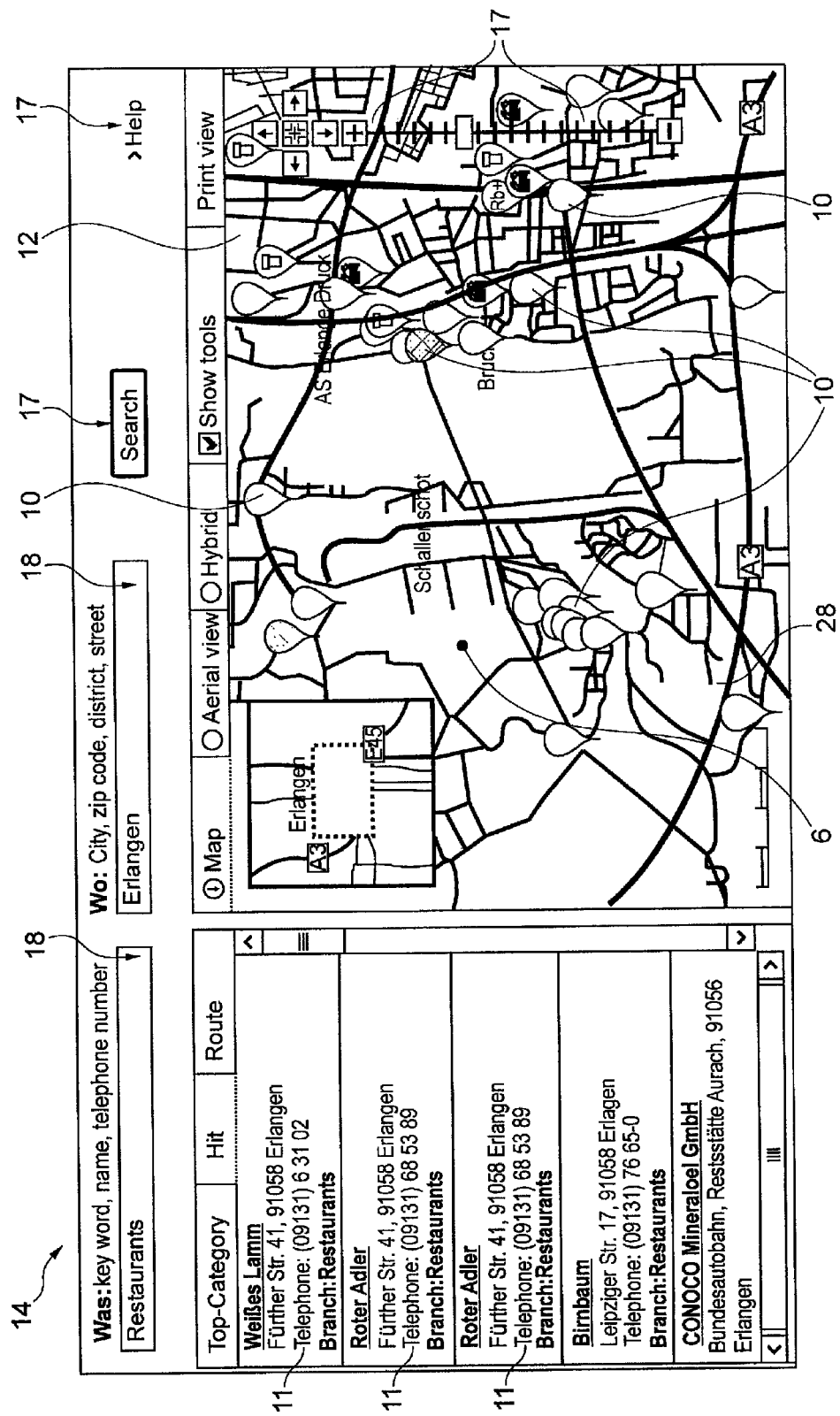
FIG. 2 schematically shows displayed WLAN localization and location-based service supply according to a further exemplary embodiment of the present invention.

FIG. 2 shows an exemplary embodiment of a browser 14 for displaying WLAN localization and location-based services to a user on the mobile device 1. Thereby the geographical unit 28 is mapped 12 and different functions 17 of the browser may supply adequate navigating tools to the user to identify the visualized locations of different service supplies 10 and to find them on the display and afterwards navigate to them in reality. Furthermore, the calculated position of the mobile device is displayed 6 which position has been calculated beforehand by the process of WLAN localization. Searching tools for the service demand 18 enable the user to specify his requested service wherein information about different businesses for the location-based service supply 11 are shown on the left-hand side of FIG. 2. Thereby the user is provided with different information like telephone numbers, addresses, Internet locations, and for example price and reservation information in case of restaurants or hotels. Thereby the mobile device provides especially service offers, that have been selected on basis of and with respect to the before calculated actual position. By using a zooming tool 17 of the browser it may be desirable to specify the region, from which the mobile device shall use WLAN signals for localization. This might increase the resolution of the localization. Furthermore Java applications, WAP functionalities, different offline services and mobile web may be comprised.

Figure 3:
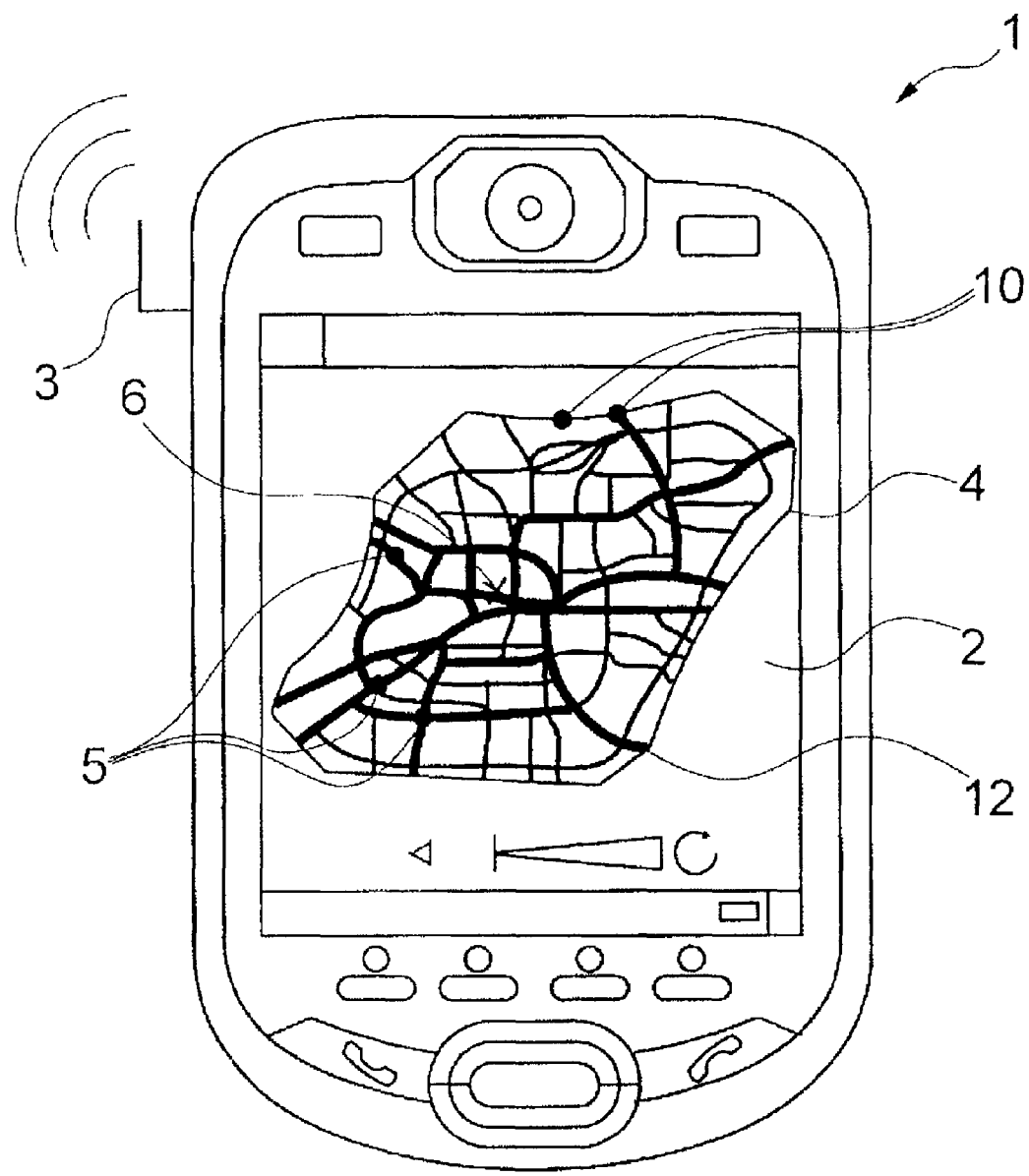
FIG. 3 shows a mobile device according to another exemplary embodiment of the present invention.

FIG. 3 shows an exemplary embodiment of a mobile device 1, wherein this example shows a PDA with a display 2 and a WLAN receiver 3. The shown mapped geographical unit 12 exhibits three different positions of received WLAN senders 5 and the visualized locations of different service supplies 10 have been chosen on basis of the beforehand calculated position of the mobile device 6. The visualized map data 4 thereby exhibits a design which is adapted to the service request of the user. It may further be chosen or especially extracted from a larger sized map on basis of the speed and direction of the movement of the user. An especially for that purpose software may be installed on the mobile device to perform all necessary steps of the inventive method. An additional feature like an emergency call option with the opportunity to parallel send the local position may further be comprised.

Figure 4:
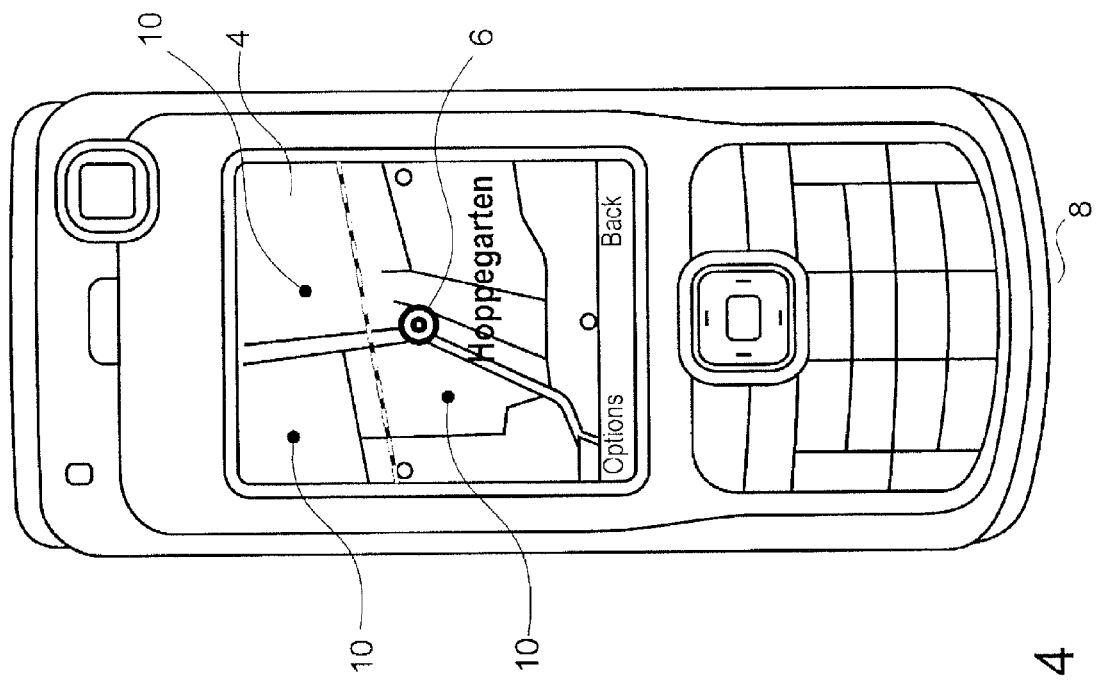
FIG. 4 shows another mobile device according to another exemplary embodiment of the present invention.
Figure 4:
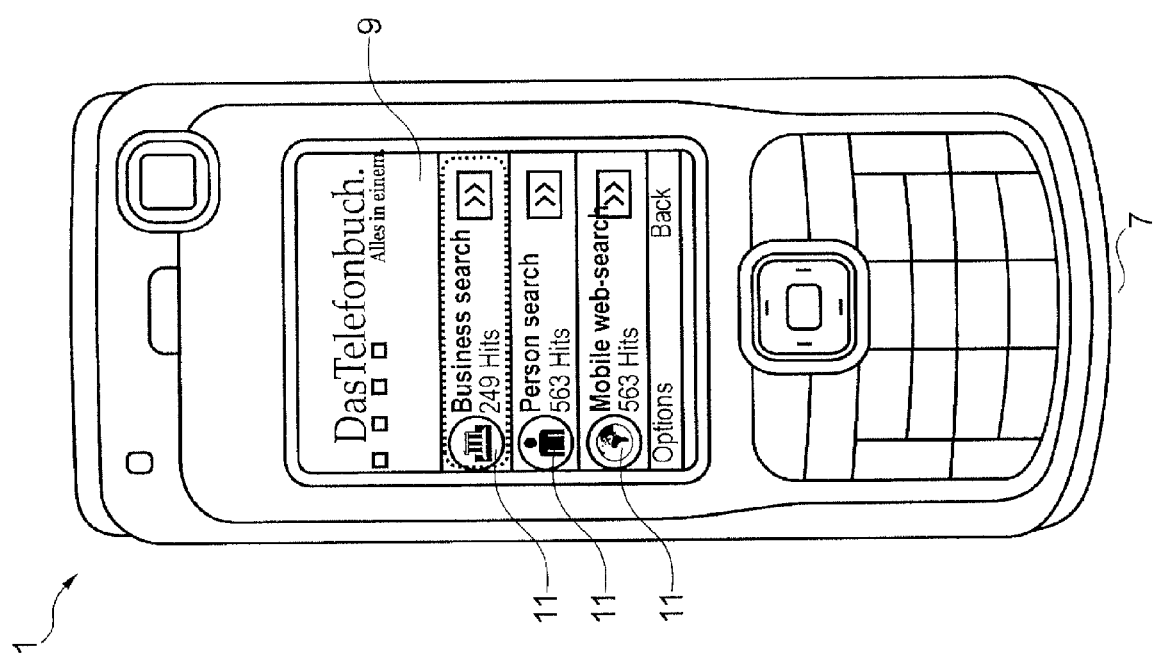
Figure 5:
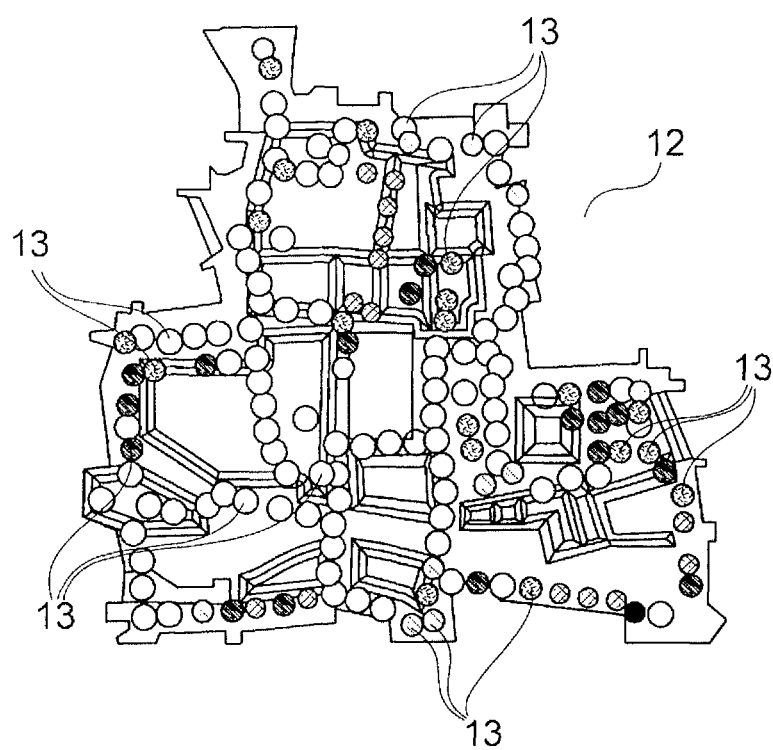
FIG. 5 schematically shows map data of a geographical unit according to another exemplary embodiment of the present invention.

FIG. 4 shows another exemplary embodiment of a mobile device 1 on which the inventive method for WLAN localization and location-based service supply may be performed. As other examples of mobile devices, any cellular phone, PDA or other handhelds that are able to receive WLAN signals might be used as a mobile device. Further on, normal computers or notebooks or sub-notebooks might be applied for this purpose. Thereby two different, exemplary user interfaces 7 and 8 are shown in FIG. 4 whereby the first user interface 7 offers different businesses for the local-based service supply which offer a choice for the user of the mobile device. The visualized service data 9 may therefore comprise different searching tools with different searching algorithms. The second user interface 8 specifies the exact demand of the user i.e. the searching hits of the mobile device on visualized map data 4. Thereby the visualized locations of different service supplies 10 are shown as well as the actual position of the mobile device FIG. 5 shows a schematic representation of a mapped geographical unit 12 wherein in different positions 13 the available number of WLAN senders are shown. This demonstrates that in every position within the infrastructure of the shown city more than 3 WLAN senders could be seen by the mobile device.

Figure 6:
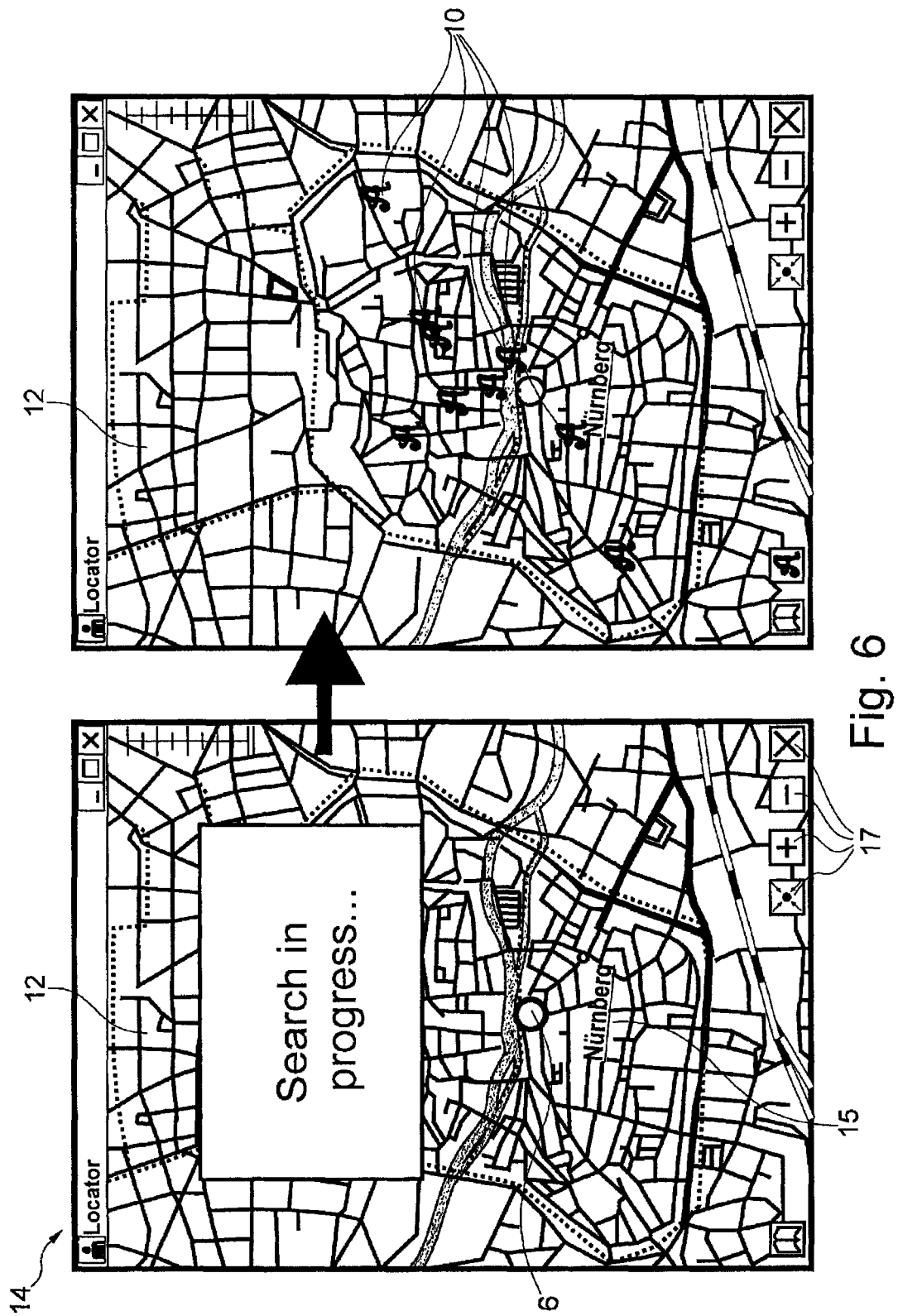
FIG. 6 schematically shows displayed WLAN localization and location-based service supply according to another exemplary embodiment of the present invention.

FIG. 6 shows two different visualizations of a browser 14 for displaying localization and local-based services. The mapped geographical unit 12 is shown within the browser 14 wherein the beforehand calculated position of the mobile device is displayed 6. Further on, an identification of the geographical unit in which the user is moving at the moment may be done 15. Different functions of the browser 17 equip the user with adequate searching and displaying tools. On the right-hand side different results for a pharmacy demand are visualized with respect to their locations 10 in the geographical unit.

Figure 7:
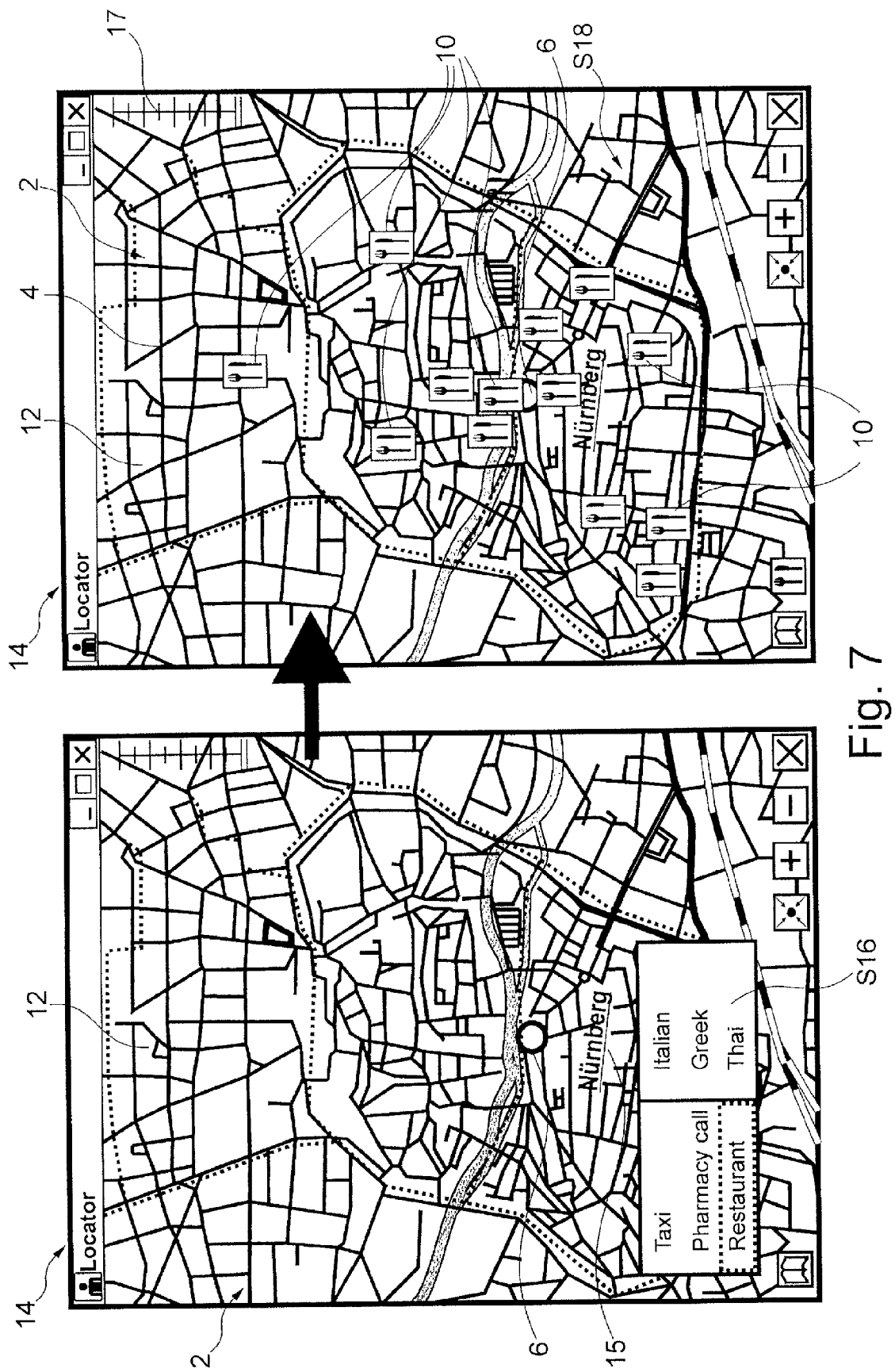
FIG. 7 shows displayed WLAN localization and location-based service supply according to another exemplary embodiment of the present invention.

FIG. 7 shows another exemplary embodiment of a service demand by a user of a mobile device done for example on a display 2 being a touch screen. Thereby the demand S16 is answered by a service supply S18 visualized by the browser 14. The displayed calculated position 6 and the name of the geographical unit 15 are shown on the visualized map data 4. The small window on the left-hand side of the left browser window demonstrates the receiving of a user demand for a location-based service S16 as well as the offer of different services S18 like a Thai restaurant, a Greek restaurant and an Italian restaurant. On the right-hand side the successful selection of services out of the service data set, that may be stored on the mobile device, are shown 10. Thereby the speed and orientation of the movement of the user might be considered during the selection of the different service supplies 10.

Figure 8:
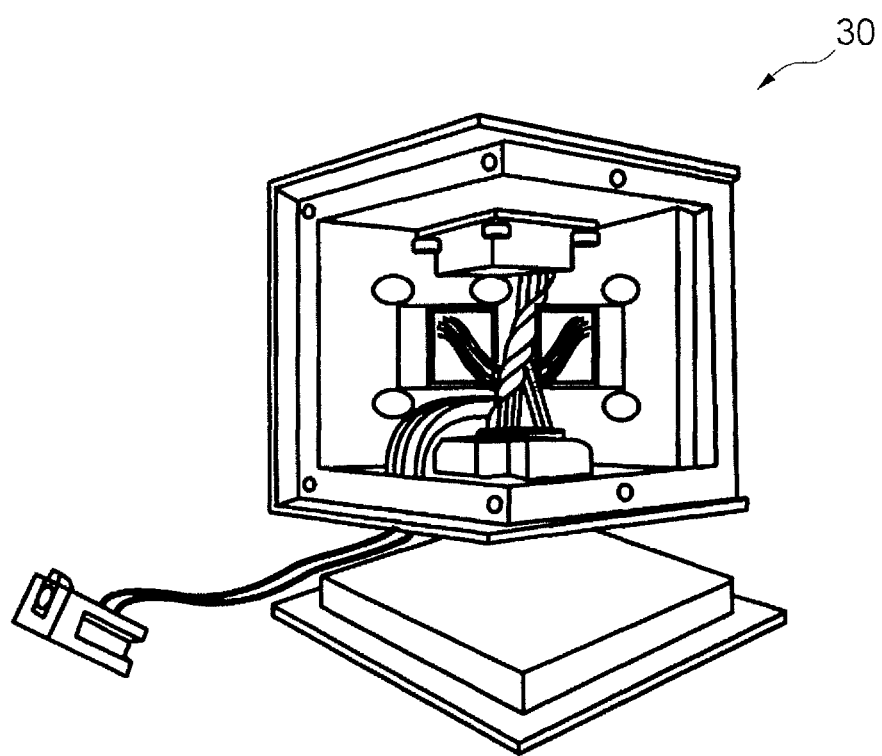
FIG. 8 schematically shows a gauging device according to another exemplary embodiment of the present invention.

FIG. 8 shows a gauging device 30 which may use sensor systems considering inertia and/or map matching. In other words a combination of the method for WLAN localization and location based service supply and other localisation systems may provide optimal results. For example outside of cities if no WLAN senders are available GPS information should be used alternatively. Furthermore the usage of mapping information like street layout forces detection processes could be possible to the next possible position, at which WLAN signals are reachable again.

Furthermore, it is possible that the WLAN localization system analyzes a hybrid localization that may combine the advantages of GPS and WLAN localization to an optimum of resolution.

Figure 9:
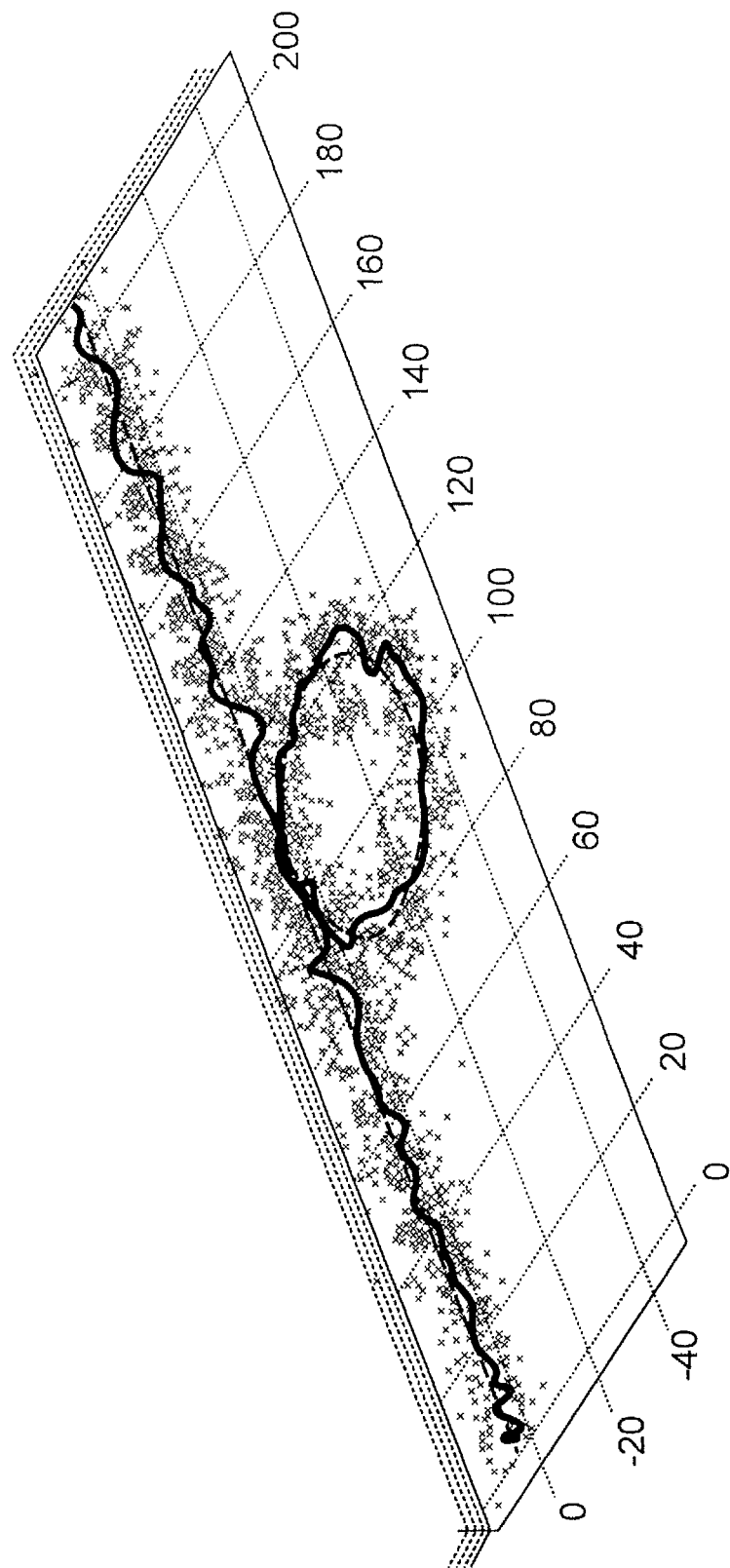
FIG. 9 schematically shows a demo WLAN navigation experiment along a given route.

FIG. 9 shows a demo WLAN-navigation experiment. The first, straight line is the given movement route, the x-marks are WLAN-Stations along the route. The second, curved line shows the result of the navigation experiment based on WLAN position detection and navigation according to a predefined route.

Figure 10:
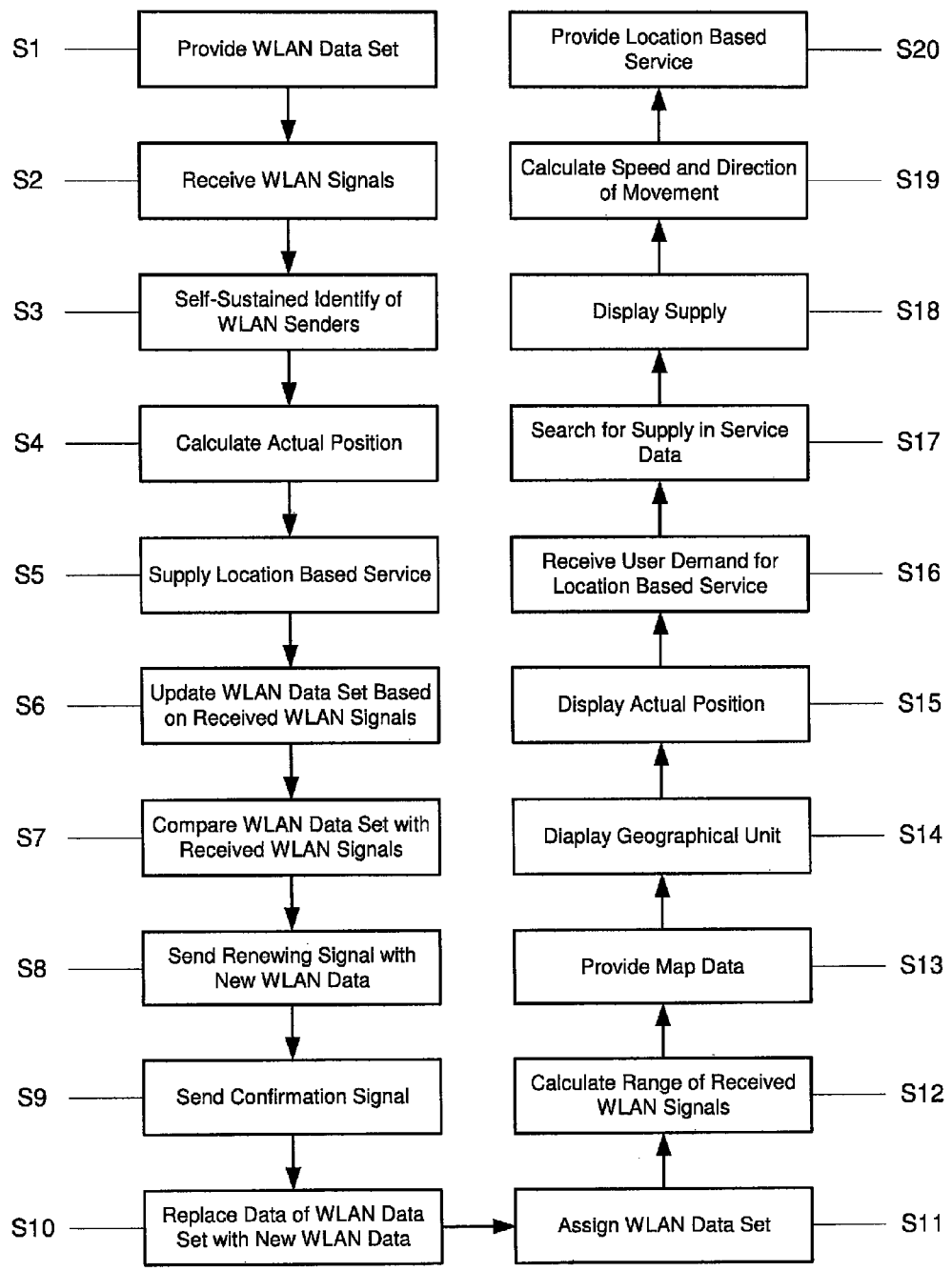
FIGS. 10 and 11 show flow diagrams schematically representing steps of a method for WLAN localization and location-based service supply according to exemplary embodiments of the present invention.
Figure 11:
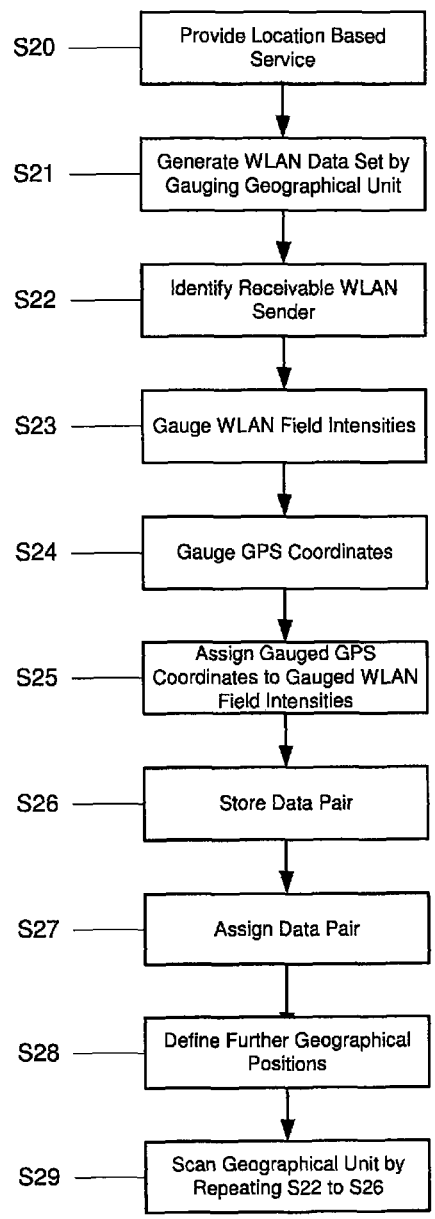

FIG. 10 and FIG. 11 show flow diagrams schematically representing steps of a method of WLAN localization and location-based service supply that is based on the self-sustained and autarkic WLAN localization of a mobile device. Therefore the method steps S1-S29 are shown.

Other variations to the disclosed embodiments can be understood and effected by those skilled in the art in practising the claimed invention, from the study of the drawings, the disclosure, and the appended claims. In the claims the word "comprising" does not exclude other elements or steps and the indefinite article "a" or "an" does not exclude a plurality. A single processor or other unit may fulfil the functions of several items or steps recited in the claims. The mere fact that certain measures are recited in mutually different dependent claims does not indicate that a combination of these measures cannot be used to advantage. A computer program may be stored/distributed on a suitable medium such as an optical storage medium or a solid-state medium supplied together with or as part of other hardware, but may also be distributed in other forms, such as via the Internet or other wired or wireless telecommunication systems. Any reference signs in the claims should not be construed as limiting the scope of the claims.

LIST OF REFERENCE NUMERALS

S1 providing a WLAN data set of a geographical unit for the usage in a mobile device
S2 receiving WLAN signals by the mobile device from at least three WLAN senders
S3 self-sustained identifying of the WLAN senders by the mobile device on basis of the received WLAN signals
S4 calculating an actual position of the mobile device by the mobile device on basis of the WLAN data set and on basis of the received WLAN signals from the at least three different WLAN senders
S5 supplying a location based service by the mobile device to a user of the mobile device on basis of the calculated actual position
S6 updating the WLAN data set by the mobile device on basis of the received WLAN signals
S7 comparing the WLAN data set with the received WLAN signals by the mobile device with respect to the actual position
S8 sending a renewing signal with new WLAN data by the mobile device to a storing site of the WLAN data set in case of a deviation after the comparing
S9 sending a confirmation signal with a time stamp by the mobile device to the storing site in case of no deviation after the comparing
S10 replacing data of the WLAN data set by the new WLAN data in case of a deviation after the comparing;
S11 assigning the WLAN data set with a time stamp in case of no deviation after the comparing
S12 calculating a range of the received WLAN signals on basis of the WLAN signals and on basis of the surrounding of the actual position
S13 providing map data for the mobile device;
S14 displaying at least a part of the geographical unit to the user by using the map data
S15 displaying the actual position to the user on a display
S16 receiving a user demand for a location based service
S17 searching for at least one supply in the service data by the mobile device on basis of the calculated actual position
S18 displaying the at least one supply on a display to the user
S19 calculating a speed and a direction of movement of the mobile device on basis of multiple calculated positions during a period of time
S20 supplying a location based service by the mobile device on basis of the calculated speed and direction of movement of the mobile device
S21 generating the WLAN data set by gauging the geographical unit with respect to WLAN signals
S22 identifying each receivable WLAN sender at a chosen geographical position within the geographical unit on basis of WLAN signals sent by each sender
S23 gauging WLAN field intensities of each receivable WLAN sender at the chosen geographical position
S24 gauging the GPS coordinates of the chosen geographical position
S25 assigning the gauged GPS coordinates to the gauged WLAN field intensities resulting in a data pair for each receivable WLAN sender and for the chosen geographical position
S26 storing the data pair for each receivable WLAN sender and for the geographical position in the WLAN data set
S27 assigning the data pair of each receivable WLAN sender with time stamps resulting in time data pairs
S28 defining further geographical positions within the geographical unit
S29 scanning the geographical unit by repeating steps S22 to S26 at the defined further geographical positions
1 mobile device
2 display
3 WLAN receiver
4 visualized map data
5 displayed positions of received WLAN senders
6 displayed calculated position of the mobile device
7 user interface one
8 user interface two
9 visualized service data
10 visualized locations of different service supplies
11 different businesses for the local based service supply
12 mapped geographical unit
13 WLAN sender positions
14 browser for displaying localization and local based services
15 identified geographical unit
16 displayed demand for service
17 different functions of the browser
18 searching tools for the service demand 19 user interface of the working station
20 computer program element
21 computer readable medium
22 working station/server
23 display of working station
24 sender/receiver of the working station
25 user
26 sending unit
27 memory
28 geographical unit
29 WLAN sender within the geographical unit
30 Gauging device
31 Updating device
32 WLAN data set
33 Service data set

The invention claimed is:

1. A method for WLAN localization and location based service supply, comprising:
storing a WLAN data set of a geographical unit on a mobile device for the usage in the mobile device;
receiving WLAN signals by the mobile device from at least three WLAN senders;
self-sustained identifying of the WLAN senders by the mobile device on basis of the received WLAN signals;
calculating an actual position of the mobile device by the mobile device by comparing the WLAN data set with the received WLAN signals from the WLAN senders;
updating the WLAN data set as a function of the received WLAN signals, wherein the updating comprises:
comparing the WLAN data set with received WLAN signals with respect to the actual position;
sending a renewing signal with new WLAN data to a storing site of the WLAN data set in case of a deviation after the comparing; and
replacing data of the WLAN data set by the new WLAN data in case of a deviation after the comparing;
receiving an user demand for a location based service;
searching for at least one supply in a service data set by the mobile device on basis of the calculated actual position; and
supplying a location based service by the mobile device to a user of the mobile device on basis of the calculated actual position,
wherein the WLAN Data set is a WLAN fingerprint of the geographical unit.

2. The method according to claim 1, wherein the updating steps comprises the following substeps:
sending a confirmation signal with a time stamp by the mobile device to the storing site in case of no deviation after the comparing; and
assigning the WLAN data set with a time stamp in case of no deviation after the comparing.

3. The method according to claim 1, further comprising:
calculating a range of the received WLAN signals on basis of the WLAN signals and on basis of surrounding of the actual position.

4. The method according to claim 1, wherein the identifying and the calculating of the actual position of the mobile device does not need any web access.

5. The method according to claim 1, wherein the calculation of the actual position tolerates a defined deviation of the received WLAN signals compared to the WLAN data set.

6. The method according to claim 1, wherein the location based service is supplied from a service data set and wherein the service data set is downloadable from a server to the mobile device.

7. The method according to claim 1, wherein the location based service is from a business chosen from the following group comprising at least one of restaurants, hotels, taxi services, medical services, pharmacy, cultural entertainment, fleet management, logistics, supply chain management, guided tours for persons, localization of public transport vehicles, mobile marketing, public relations and friend finding.

8. The method according to claim 1, further comprising:
providing map data for the mobile device;
displaying at least a part of the geographical unit to the user by using the map data; and
displaying the actual position to the user on a display.

9. The method according to claim 1, further comprising:
displaying the at least one supply on a display to the user.

10. The method according to claim 1, further comprising:
calculating a speed and a direction of movement of the mobile device on basis of multiple calculated positions during a period of time.

11. The method according to claim 10, further comprising:
supplying a location based service by the mobile device on basis of the calculated speed and direction of movement of the mobile device.

12. The method according to claim 1, wherein the calculation of the actual position is done by a first algorithm on the mobile device.

13. The method according to claim 1, wherein the calculation of the actual position is a three dimensional localization of the mobile device.

14. The method according to claim 1, further comprising:
generating the WLAN data set by gauging the geographical unit with respect to WLAN signals.

15. The method according to claim 14, wherein the generation of the WLAN data set comprises the following substeps:
identifying each receivable WLAN sender at a chosen geographical position within the geographical unit on basis of WLAN signals sent by each sender;
gauging WLAN field intensities of each receivable WLAN sender at the chosen geographical position;
gauging GPS coordinates of the chosen geographical position;
assigning the gauged GPS coordinates to the gauged WLAN field intensities resulting in a data pair for each receivable WLAN sender and for the chosen geographical position; and
storing the data pair for each receivable WLAN sender and for the geographical position in the WLAN data set.

16. The method according to claim 15, further comprising:
assigning the data pair of each receivable WLAN sender with time stamps resulting in time data pairs.

17. The method according to claim 16, further comprising:
defining a further geographical position within the geographical unit;
scanning the geographical unit by performing the following step at the defined further geographical position;
identifying each receivable WLAN sender at a chosen geographical position within the geographical unit on basis of WLAN signals sent by each sender;
gauging WLAN field intensities of each receivable WLAN sender at the chosen geographical position;
gauging GPS coordinates of the chosen geographical position;
assigning the gauged GPS coordinates to the gauged WLAN field intensities resulting in a data pair for each receivable WLAN sender and for the chosen geographical position; and storing the data pair for each receivable WLAN sender and for the geographical position in the WLAN data set.

18. The method according to claim 1, wherein the generation of the WLAN data set is done by a second algorithm on a gauging device.

19. A mobile device for WLAN localization and location based service supply, comprising:
- a memory arrangement storing a WLAN data set of a geographical unit, the WLAN data set being a WLAN fingerprint of the geographical unit;
- a WLAN receiver configured to receive WLAN signals;
- a processor configured to calculate an actual position of the mobile device by comparing the WLAN data set with the received WLAN signals; and
- a display configured to provide a location based service to a user of the mobile device on basis of the calculated actual position,
- wherein the mobile device is configured at least for (a) receiving a user demand for the location based service and (b) searching for at least one supply in a service data set on basis of the calculated actual position,
- wherein the mobile device is configured to (a) compare the WLAN data set with the received WLAN signals with respect to the actual position, (b) send a renewing signal with new WLAN data to a storing site of the WLAN data set in case of a deviation after the comparing, and (c) replace data of the WLAN data set by the new WLAN data in case of a deviation after the comparing.

20. The mobile device according to claim 19, further comprising:
- a sending unit configured to send an updating signal to a storing site of the WLAN data set on basis of the comparison.

21. A computer readable non-transitory medium including a set of instructions executable by a processor, the set of instructions operable to:
- storing a WLAN data set of a geographical unit on a mobile device for the usage in the mobile device;
- receiving WLAN signals by the mobile device from at least three WLAN senders;
- self-sustained identifying of the WLAN senders by the mobile device on basis of the received WLAN signals;
- calculating an actual position of the mobile device by the mobile device by comparing the WLAN data set with the received WLAN signals from the WLAN senders;
- updating the WLAN data set as a function of the received WLAN signals, wherein the updating comprises:
  - comparing the WLAN data set with the received WLAN signals with respect to the actual position;
  - sending a renewing signal with new WLAN data to a storing site of the WLAN data set in case of a deviation after the comparing; and
  - replacing data of the WLAN data set by the new WLAN data in case of a deviation after the comparing;
- receiving an user demand for a location based service;
- searching for at least one supply in a service data set by the mobile device on basis of the calculated actual position; and
- supplying a location based service by the mobile device to a user of the mobile device on basis of the calculated actual position,
- wherein the WLAN Data set is a WLAN fingerprint of the geographical unit.

* * * * *